US008892545B2

(12) United States Patent
Kazmaier et al.

(10) Patent No.: US 8,892,545 B2
(45) Date of Patent: Nov. 18, 2014

(54) GENERATING A COMPILER INFRASTRUCTURE

(75) Inventors: Gerrit Simon Kazmaier, Heidelberg (DE); Sebastian Schroetel, Heidelberg (DE); Ulrich Bestfleisch, Schwetzingen (DE); Nadine Sachs, Wiesloch (DE)

(73) Assignee: SAP SE, Walldorf (DE)

( * ) Notice: Subject to any disclaimer, the term of this patent is extended or adjusted under 35 U.S.C. 154(b) by 308 days.

(21) Appl. No.: 13/335,935

(22) Filed: Dec. 23, 2011

(65) Prior Publication Data

US 2013/0166495 A1  Jun. 27, 2013

(51) Int. Cl.
*G06F 7/00* (2006.01)
*G06F 17/30* (2006.01)

(52) U.S. Cl.
CPC .... *G06F 17/30592* (2013.01); *G06F 17/30684* (2013.01)
USPC .......... 707/722; 707/756; 707/769; 705/7.25; 705/348; 709/246; 717/100; 717/136; 717/140; 717/219

(58) Field of Classification Search
None
See application file for complete search history.

(56) References Cited

U.S. PATENT DOCUMENTS

| 7,571,192 | B2 * | 8/2009 | Gupta et al. ........................... 1/1 |
| 7,707,143 | B2 * | 4/2010 | Bruce et al. ............ 707/999.003 |
| 7,945,575 | B2 * | 5/2011 | Cushing et al. ................ 707/760 |
| 8,359,305 | B1 * | 1/2013 | Burke et al. ................... 707/706 |
| 2005/0159995 | A1 * | 7/2005 | Woehler .......................... 705/10 |
| 2006/0149778 | A1 * | 7/2006 | Clover ........................... 707/102 |
| 2007/0078823 | A1 * | 4/2007 | Ravindran et al. ................ 707/3 |
| 2011/0035353 | A1 * | 2/2011 | Bailey ........................... 707/602 |
| 2013/0132333 | A1 * | 5/2013 | De Smet et al. .............. 707/600 |

\* cited by examiner

*Primary Examiner* — Debbie Le
*Assistant Examiner* — Hasanul Mobin

(57) ABSTRACT

In an embodiment, the compiler infrastructure allows execution of multidimensional analytical metadata from various databases by providing a generic transformation. A compilation request to execute a multidimensional analytical metadata is received. A type of the compilation request is determined to identify an associated transformation and corresponding transformation rules. Based upon the type of compilation request, a database of an application server is queried to retrieve the corresponding multidimensional analytical metadata. Based upon the identified transformation rules, the multidimensional analytical metadata is transformed into a generic metadata that is executable by any desired engine. An instance of a calculation scenario is generated based upon the transformation. The compiler infrastructure is generated by deploying the instance of the calculation scenario in the desired engine (e.g. in-memory computing engine.)

19 Claims, 5 Drawing Sheets

GENERATING A COMPILER INFRASTRUCTURE

RELATED APPLICATIONS

This application is related to three co-pending U.S. Applications—
1. U.S. application Ser. No. 13/335,937 having titled 'EXECUTING RUNTIME CALLBACK FUNCTIONS', filed on Dec. 23, 2011;
2. U.S. application Ser. No. 13/335,938 having titled 'DYNAMIC RECREATION OF MULTIDIMENSIONAL ANALYTICAL DATA', filed on Dec. 23, 2011; and
3. U.S. application Ser. No. 13/335,939 having titled 'GENERATING A RUNTIME FRAMEWORK', filed on Dec. 23, 2011, all of which are herein incorporated by reference in its entirety for all purposes.

FIELD

The field generally relates to computer systems and software, and more particularly to various methods and systems to generate a multidimensional compiler infrastructure.

BACKGROUND

In computing, Online Analytical Processing (OLAP) tools enable users to interactively analyze multidimensional data from various perspectives. Applications of OLAP include business reporting for sales, marketing, management reporting, business process management, budgeting and forecasting, financial reporting and the like. OLAP processors use data stored in in-memory databases for analytical processing. An in-memory database is a database management system that primarily relies on volatile memory for computer data storage. A plurality of data sources may be associated with such an in-memory database, and each of the data sources may have unique properties. To execute operations on the in-memory database, the properties of the data present in the database may need to be modified.

SUMMARY

Various embodiments of systems and methods to generate a compiler infrastructure are disclosed. In an embodiment, a compiler receives a compilation request including a request to generate an instance of a calculation scenario. The compiler determines a type of the received compilation request to identify an associated transformation. A database of an application server is queried, to retrieve multidimensional analytical metadata corresponding to the compilation request from the database of the application server. Based upon transformation rules associated with the type of compilation request, a processor in communication with the compiler transforms the multidimensional analytical metadata into an in-memory computing engine executable metadata. An instance of a calculation scenario is generated based upon the transformation. The compiler infrastructure is generated by deploying the instance of the calculation scenario in the in-memory computing engine.

In an embodiment, transforming the multidimensional analytical metadata includes mapping the multidimensional analytical metadata corresponding to the compilation request with one or more calculation patterns associated with the in-memory computing engine. A calculation pattern may be generated by transforming contents of the multidimensional analytical metadata into artifacts that are executable by the in-memory computing engine.

In an embodiment, a system includes a processor to read and execute instructions stored in a memory element that is in communication with the processor. The memory includes instructions to execute the generation of the compiler infrastructure. The processor may be in communication with various compilation modules including a database, a multidimensional analytical compiler, an in-memory computing engine, a transformation library, a pattern generator and the like, to generate the compiler infrastructure.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
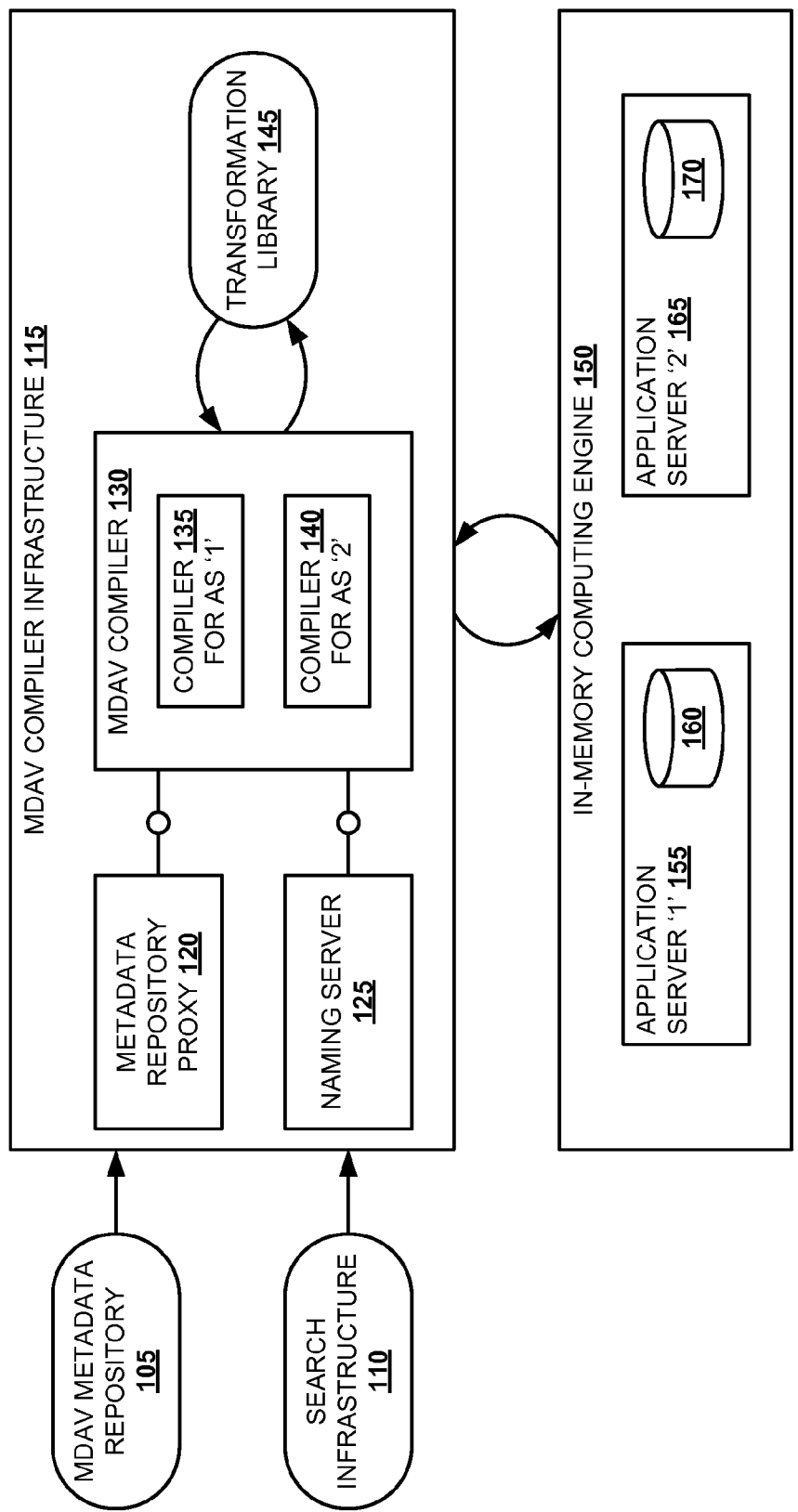
FIG. 1 is a block diagram illustrating an overview of a system to generate a compiler infrastructure, according to an embodiment.

Embodiments of techniques for systems and methods to generate a compiler infrastructure are disclosed. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Business data warehouse of an enterprise is a repository of an enterprise's data where the data is standardized, structured, integrated, and managed. Metadata associated with the data warehouse defines contents of the data warehouse and the functioning of the data present in the data warehouse.

Metadata of various traditional business data warehouses are replaced by multidimensional analytical views (MDAVs), which represent a business object based metadata model for analytics. The analytics include computer technology, operational research, and statistics to solve different problems in business and industry scenarios such as enterprise decision management, marketing analytics, portfolio analysis, credit risk analysis, and the like. Metadata associated with the MDAV may be stored in an in-memory computing engine.

The in-memory computing engine is a part of applications that are built using in-memory technology. In-memory technology is a database management technology that stores computer related data on main memory. Since the information is stored on main memory, processing of all data transactions are executed on main memory without having to access the external storage media, thereby reducing I/O reading activity when querying a database. The in-memory computing combines transactions and analytics to provide efficient storage, search and ad-hoc analysis of real-time information. In-memory analytics may be described as an approach to query data residing on the main memory, resulting in quick response time. In-memory computing applications are built based on business driven use cases, specifically in industries requiring processing of large data volumes or real-time processing such as banking, retail, utilities/energy, and telecommunications. Examples where in-memory technology may be applied to build business applications include: demand forecasting based on huge data volumes provided by smart meter devices in utilities industries; managing energy cost in energy intensive industries with in-memory analytics and forecasting based on fine grained consumption data; trade promotion management solutions for retailers and consumer products companies with high data volumes; real-time risk management and cumulated risks calculation for insurance companies in the corresponding area; internal and external risk management and regulatory reporting for banking sector; and the like.

In an embodiment, the in-memory computing engine is configured to execute the data stored in an in-memory database of a computing device. The execution of the data may render an outcome of a business application associated with the in-memory computing engine. The in-memory computing engine is associated with a runtime module accessed during a runtime of execution of the data; and a compile time module accessed while compiling the computing engine. The in-memory computing engine includes a pattern generation module to generate calculation patterns or calculation rules defined for the in-memory computing engine; and a calculation scenario that represents a group of operations (e.g., mathematical operations) that need to be executed.

Metadata of the business applications associated with the MDAV (referred to as "MDAV metadata") may be stored in the in-memory computing engine. The MDAV metadata comprehends the meaning of the data contained in various data sources associated with the in-memory computing engine. The MDAV serve as data providers for the OLAP processor as they include the analytical data. The analytical data itself is stored in the in-memory computing engine. The in-memory computing engine is associated with various application servers to carry out various business processes. These application servers include distinguishing parameters and corresponding semantics to perform their respective business processes. Hence, a generic platform is required to carry out the business processes. A compiler infrastructure facilitates a transformation of the MDAV metadata associated with the various application servers into a generic metadata that is executable by the in-memory computing engine. To generate the compiler infrastructure, MDAV metadata stored in a database of an application server is executed by loading, transforming, and deploying the MDAV metadata to a desired engine (e.g., the in-memory computing engine). A compiler infrastructure facilitates in executing the MDAV metadata in various data sources associated with various types of application servers. Databases of various application servers include distinguishing parameters and corresponding semantics. In an embodiment, the compiler infrastructure is generated at compile time of the MDAV execution.

FIG. 1 is a block diagram illustrating an overview of a system to generate a compiler infrastructure, according to an embodiment. MDAV may be further described as a metadata model for analytics, providing data for OLAP processing. Many OLAP data accesses are performed via MDAV runtime, which is a dedicated application server based runtime model built upon a search infrastructure to access an index of the application server. A compiler infrastructure allows executing the MDAV metadata in various databases associated with various application servers. To execute MDAV metadata from various databases, a transformation of the metadata into a generic format is required since parameters and semantics of each database may vary. By generating a compiler infrastructure, a generic transformation platform is provided along with a set of reusable transformation services without rewriting the MDAV metadata in a MDAV repository. MDAV compiler infrastructure 115 allows creating an instance of a calculation scenario executable by various application servers associated with in-memory computing engine 150.

MDAV compiler infrastructure 115 includes metadata repository proxy 120, naming server 125, MDAV compiler 130, and transformation library 145. Metadata repository proxy 120 duplicates the MDAV metadata residing in MDAV metadata repository 105, and stores the duplicated MDAV metadata for further processing (e.g. modification or transformation). Naming server 125 is a cross-model compiler that comprehends a mapping of information of metadata associated with various application servers. Naming server 125 associates names with locations of functionalities or services and the information contained in them; and provides a mapping of the association. A processor in communication with MDAV compiler infrastructure 115 may determine the cross-model mapping residing in naming server 125 while executing the MDAV metadata. In an in-memory computing system, naming server 125 is a component that knows the topology of the system and how the data is distributed. Naming server 125 also knows the assignment of tenants to in-memory computing database servers. In a system with data distribution, naming server 125 knows which tables or partitions of tables are located on which in-memory computing database server.

Transformation library 145 is a collection of one or more formulae and/or rules that enable a transformation of MDAV metadata into desired in-memory compatible format, without using application server coding. Transformation library 145 may include date functions, basic functions, mathematical functions, and the like to execute transformation. The formulae and/or rules residing in transformation library 145 are reusable transformation in a generic format (for e.g. extensible markup language (XML) format), and include information about a target model (for e.g. in-memory computing engine 150). Based upon the generic transformation and the information about the target model, the MDAV metadata transformation may be executed.

MDAV compiler 130 includes a compilation component (not shown in FIG. 1), which is responsible for executing various compilation phases involved during the process of transformation of MDAV metadata; and one or more characteristic compilers (e.g. 135 and 140) that are specific to each target application server. A target application server may be an in-memory computing engine (e.g. 150, or 155 or 165) to which the calculation scenario is deployed. Search infrastructure 110 references business objects associated with one or more application servers. Search infrastructure 110 is operable to access an index of business data for executing the MDAV metadata. In-memory computing engine 150 is an in-memory computing database system housing various application servers and corresponding databases (for e.g. 155 and 160; 165 and 170). The transformation of MDAV metadata to an in-memory computing engine executable metadata is to generate a generic metadata that is executable by any of the various application servers residing in the in-memory computing database system.

MDAV compiler 130 includes characteristic compiler 135 associated with application server '1' 155; and characteristic compiler 140 associated with application server '2' 165. In an embodiment, MDAV compiler 130 receives a compilation request. The compiler request may be received from a computer generated user interface, or a user or a system that requires a compilation of the MDAV metadata to be executed. The compilation request may include a request to generate MDAV compiler infrastructure 115, or to generate a calculation scenario or an instance of a calculation scenario, or the like, to accomplish an execution of MDAV metadata in in-memory computing engine 150.

On receiving the compilation request, MDAV compiler 130 determines a type of the received compilation request to identify an associated transformation. The compilation request may be received to transform the MDAV metadata associated with a first application server (for e.g. 155) to in-memory computing engine executable metadata that is executable on a second application server (for e.g. 165). The type of compilation request enables identification of a type of transformation to be applied to the MDAV metadata. Identifying a type of transformation includes identifying one or more transformation rules and transformation functions from transformation library 145 to be applied to MDAV metadata.

MDAV compiler 130 interprets the metadata associated with the compilation request to identify MDAV metadata present in a corresponding database of an application server. MDAV compiler 130 queries a database associated with an application server corresponding to the compilation request, to retrieve MDAV metadata corresponding to the compilation request. In an embodiment, MDAV compiler 130 instructs characteristic compiler 135 to query corresponding database 160 of application server '1' 155 to retrieve MDAV metadata corresponding to the compilation request. MDAV compiler 130 instructs a characteristic compiler (e.g. 135 or 140) based upon the type of the received compilation request.

In an embodiment, based upon the associated transformation rules, MDAV compiler 130 prepares the MDAV metadata associated with the compilation request for transformation. Preparing the MDAV metadata includes adapting the MDAV metadata by adding fields to the MDAV metadata which are necessary for casting one or more data types, changing one or more attributes of a member field, adding a source field mapping and the like. Preparing the MDAV metadata facilitates in a generic processing of the MDAV metadata during transformation. A processor associated with MDAV compiler 130 transforms the MDAV metadata into an in-memory computing engine executable metadata. The transformation of the MDAV metadata into in-memory computing engine executable metadata includes processing the transformation rules along with the MDAV metadata to generate an instance of a calculation scenario. In an embodiment, MDAV compiler 130 generates the instance of the calculation scenario based upon the transformation. The calculation scenario represents a transformation scenario including a procedure of transforming the MDAV metadata into an in-memory computing engine executable metadata based upon the type of compilation request, the transformation identified for the type of compilation request and the transformation rules applied. A calculation scenario may represent a procedural aspect of MDAV compiler infrastructure 115. For example, the calculation scenario includes the compilation request, the MDAV metadata retrieved for the compilation request, the transformation rules to be applied for transforming the metadata associated with the compilation request, and the in-memory computing engine executable metadata generated for the received compilation request. Thus, the calculation scenario includes many instances of the transformation of many sets of MDAV metadata based upon the compilation request. An instance of the calculation scenario may represent the procedures followed for a specific compilation request to generate a corresponding in-memory computing engine executable metadata. MDAV compiler 130 deploys the instance of the calculation scenario at MDAV compiler infrastructure 115.

Thus, MDAV compiler infrastructure 115 is associated with the required transformation procedures to transform MDAV metadata associated with a compilation request to comprehensive in-memory computing engine executable metadata. In an embodiment, MDAV compiler infrastructure 115 cross-compiles the MDAV metadata associated with one or more application servers (e.g. 155 or 165) and converts (or transforms) the cross-compiled MDAV metadata into a corresponding instance of the calculation scenario that is executable in in-memory computing engine 150.

In an embodiment, the MDAV metadata includes MDAV attributes that represent a property of business objects included in the MDAV metadata. MDAV metadata further includes a first set of attributes that are associated with the corresponding application server and a second set of attributes that are associated with a master data of an enterprise. The enterprise includes various application servers and the master data corresponds to the MDAV metadata of the enterprise. The instance of the calculation server generated further includes a first part of the calculation scenario generated based upon the first set of attributes and a second part of the calculation scenario generated based upon an aggregation of the second set of attributes and the master data of the enterprise. In another embodiment, contents of an MDAV metadata include a query definition, one or more basic MDAVs including query definition elements, selection callbacks, characteristics and key figures associated with basic MDAV. The contents of the MDAV metadata are transformed into one or more artifacts of the in-memory computing engine executable metadata by MDAV compiler infrastructure 115. In an embodiment, a basic MDAV is a type of a calculation scenario, and a method of generating a calculation pattern involving the basic MDAV type of calculation scenario is explained in detail in FIG. 4. Other types of calculation scenarios include a virtual type, a projection type, a union type, an intersection type, a join type, a temporal join type, and the like.

In an embodiment, MDAV compiler infrastructure 115 represents an analytical in-memory model to execute the MDAV metadata in one or more databases (e.g. 160 and 170) associated with corresponding one or more application servers (e.g. 155 and 165 respectively). The analytical in-memory model executes the MDAV metadata by loading the MDAV metadata in the database associated with the corresponding application server onto MDAV compiler infrastructure 115. Based upon parameters and semantics associated with the corresponding application server, the analytical in-memory model performs a cross-database transformation of the loaded MDAV metadata into metadata executable by an in-memory computing model. Further, the analytical in-memory model deploys the transformed metadata into in-memory computing engine 150 associated with the in-memory computing model. This analytical in-memory model includes an analytical engine, a data provider, a runtime analyzer, and a compiler. The analytical engine is responsible to render the MDAV metadata associated with the application server for compiling. The data provider associated with the analytical engine is responsible to read the MDAV metadata associated with the application server and initiate a runtime metadata and the runtime analyzer for compiling. The runtime analyzer is responsible to instruct the compiler to retrieve the instance of the calculation scenario generated by MDAV compiler infrastructure 115. The compiler receives the compilation request from the runtime analyzer and generates the instance of the calculation scenario by retrieving the instance of the calculation scenario from MDAV compiler infrastructure 115.

In an embodiment, transforming the MDAV metadata includes mapping the MDAV metadata corresponding to the compilation request with calculation patterns associated with the in-memory computing engine. A calculation pattern is a subset of the calculation scenario, and describes a procedure to understand a relation between the MDAV metadata and the in-memory computing engine executable metadata, and execute the MDAV metadata in the in-memory computing engine. The calculation pattern outlines a step-by-step procedure for transforming the MDAV metadata into an in-memory computing engine executable metadata. The calculation pattern includes a set of artifacts of the in-memory computing engine executable metadata as a result of a transformation performed on the MDAV metadata. The calculation pattern may include step-by-step procedure of generating a data source artifact, a projection calculation view artifact and an aggregation calculation view artifact. In another embodiment, MDAV compiler infrastructure 115 includes a transformation module to transform the contents of an MDAV metadata into one or more artifacts that are executable by in-memory computing engine 150; and a pattern generator to generate a calculation pattern by mapping the MDAV metadata with the metadata executable by in-memory computing engine 115. The generation of the calculation pattern is explained in detail in the description of FIG. 4.

Figure 2:
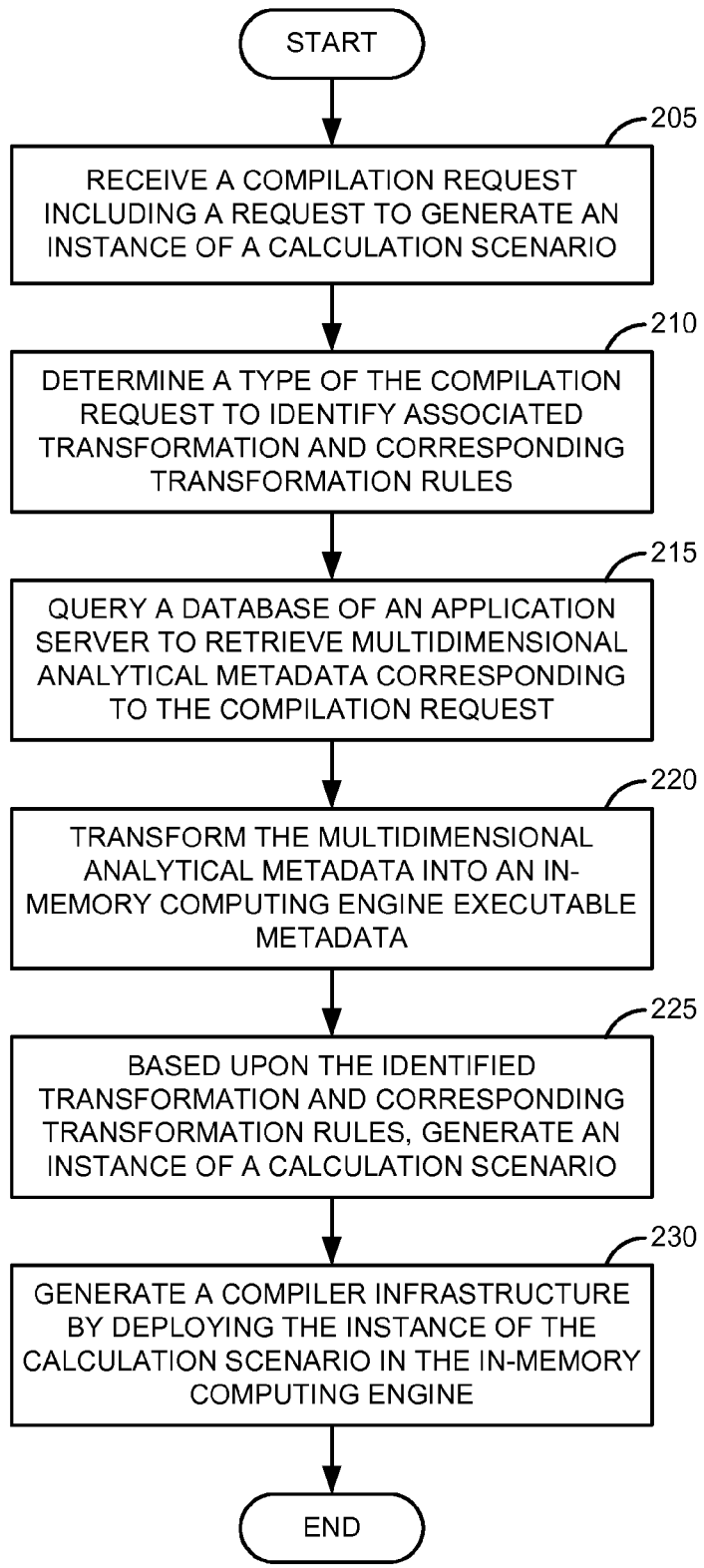
FIG. 2 is a process flow diagram illustrating a method to generate a compiler infrastructure, according to an embodiment.

FIG. 2 is a process flow diagram illustrating a method to generate a compiler infrastructure, according to an embodiment. At process block 205, a compilation request including a request to generate an instance of a calculation scenario is received. In an embodiment, the compilation request is received from a computer generated user interface. At process block 210, a type of the compilation request is determined to identify one or more associated transformation and corresponding transformation rules for the received compilation request.

At process block 215, a database of an application server is queried to retrieve multidimensional analytical (MDAV) metadata corresponding to the compilation request. In an embodiment, metadata associated with the compilation request is interpreted; and based upon the interpretation, the database is queried to retrieve the corresponding MDAV metadata. In another embodiment, the MDAV metadata includes multidimensional attributes further including a first set of attributes associated with the corresponding application server and a second set of attributes master data of an enterprise, wherein the enterprise includes one or more application servers, and the master data corresponds to MDAV metadata associated with the enterprise.

At process block 220, the retrieved multidimensional analytical metadata is transformed into an in-memory computing engine executable metadata. In an embodiment, the retrieved MDAV metadata is prepared for transformation. At process block 225, based upon the identified transformation and corresponding transformation rules, an instance of a calculation scenario is generated for the in-memory computing engine executable metadata. In an embodiment, the instance of the calculation scenario includes a first part of the calculation scenario generated based upon the first set of attributes and a second part of the calculation scenario generated based upon an aggregation of the second set of attributes and the master data of the enterprise.

At process block 230, the compiler infrastructure is generated by deploying the instance of the calculation scenario in the in-memory computing engine. The compiler infrastructure is associated with transforming the MDAV metadata associated with the application server into a comprehensive metadata that is executable in the in-memory computing engine. The compiler infrastructure cross-compiles the MDAV metadata associated with the application servers and converts the cross-compiled MDAV metadata into the instance of the calculation scenario that are further executable in the in-memory computing engine.

Figure 3:
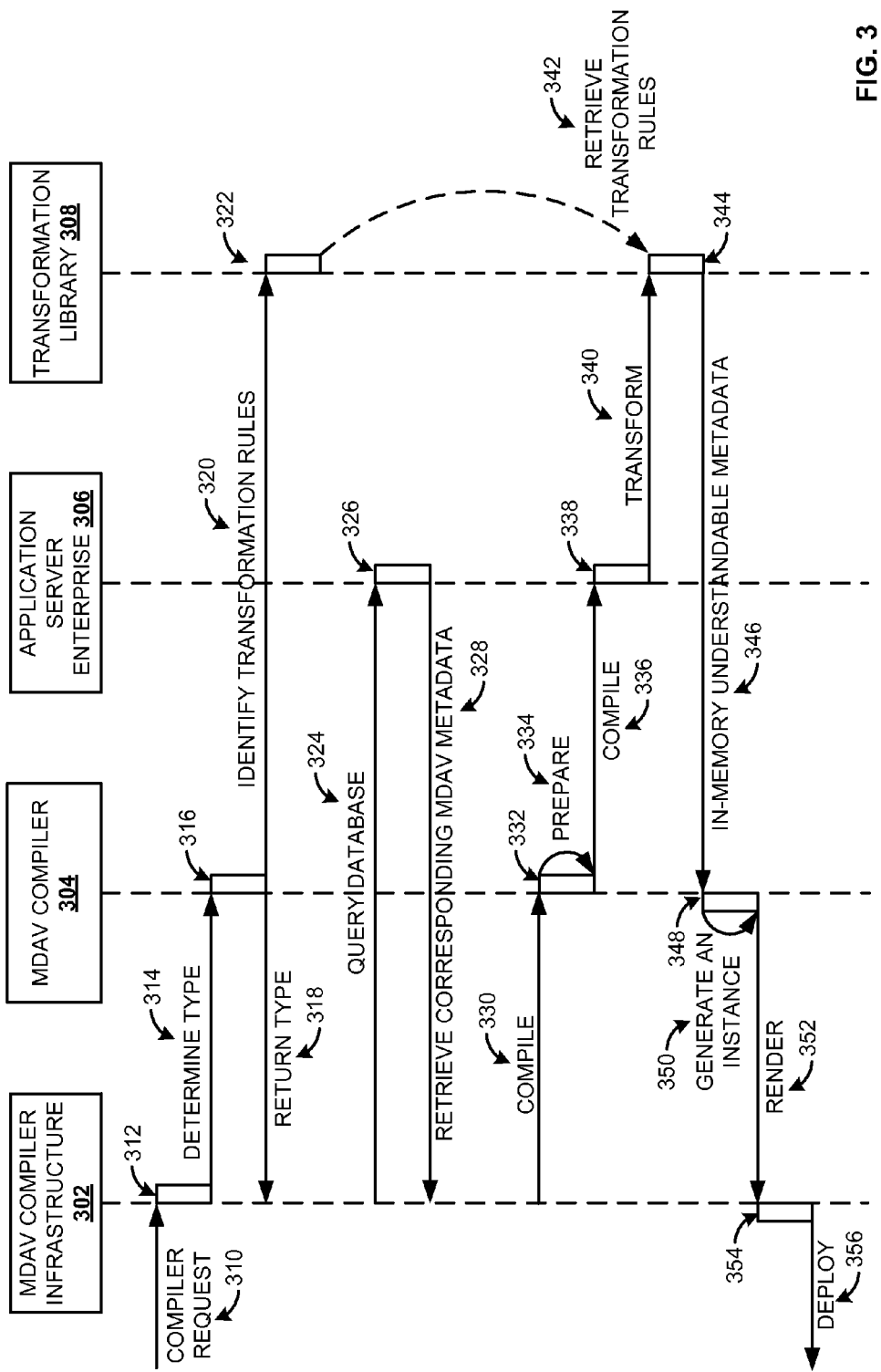
FIG. 3 is a sequence diagram illustrating a data flow to generate a compiler infrastructure, according to an embodiment.

FIG. 3 is a sequence diagram illustrating a data flow to generate a compiler infrastructure, according to an embodiment. FIG. 3 represents interactions and operations involved in the method to generate the compiler infrastructure; and illustrates process objects including MDAV compiler infrastructure 302, MDAV compiler 304, application server enterprise 306, and transformation library 308 along with their respective vertical dotted lines originating from them. The vertical dotted lines of MDAV compiler infrastructure 302, MDAV compiler 304, application server enterprise 306, and transformation library 308 represent the processes that may exist simultaneously. The horizontal arrows (for e.g., 310, 314, 318, 320, 324, 328, 330, 336, 340, 346, 352 and 356) represent the data flow between the vertical dotted lines originating from their respective process objects (for e.g., 302, 304, 306 and 308). Activation boxes between the horizontal arrows (for e.g., 312, 316, 322, 326, 332, 338, 344, 348 and 354) represent the process that is being performed at the respective process object.

MDAV compiler infrastructure 302 receives a compilation request to generate an instance of a calculation scenario. The activation box 312 at the end of the horizontal arrow 310 represents the receiving of the compiler request. MDAV compiler infrastructure 302 communicates with MDAV compiler 304 to determine a type of the compilation request. The activation box 316 at the end of the horizontal arrow 314 represents the determination of a type of the compilation request. MDAV compiler 304 determines a type of the compilation request and returns the determination (318) to MDAV compiler infrastructure 302. MDAV compiler 304 also determines a type of a transformation that may be applicable to the compilation request and identifies transformation rules corresponding to the type of transformation residing in transformation library 308. The activation box 322 at the end of the horizontal arrow 320 represents the identification of corresponding transformation rules.

Based upon the received compiler request, MDAV compiler infrastructure 302 executes a query in a database 324 associated with an application server residing in application server enterprise 306 and retrieves MDAV metadata corresponding to the compilation request 328. The activation box 326 at the end of the horizontal arrow 324 represents retrieval of corresponding MDAV metadata. MDAV compiler infrastructure 302 initiates a compilation action 330 by rendering the MDAV metadata to the MDAV compiler 304. MDAV compiler 304 prepares the MDAV metadata 332 by making modifications to the MDAV metadata. The modifications to the MDAV metadata may include data type modification, filtering of elements of the MDAV metadata that are not necessary for generating an instance of the calculation model or the like. MDAV compiler 304 begins a process of compiling the MDAV metadata and initiates application server enterprise 306. The activation box 338 at the end of the horizontal arrow 336 represents the initiation of the compilation process.

Application server enterprise 306 receives the prepared MDAV metadata from MDAV compiler 304 and renders it to transformation library 308 to carry out the transformation of the MDAV metadata into in-memory executable metadata 340. Transformation library 308 retrieves the transformation rules determined for the transformation type corresponding to the compilation request 342, and executes the transformation of the MDAV metadata based upon the transformation rules. As a result of the transformation of MDAV metadata, transformation library 308 renders the in-memory executable metadata 346 to MDAV compiler 304. The activation box 348 at the end of the horizontal arrow 346 represents the rendered in-memory executable metadata. MDAV compiler 304 generates an instance of a calculation scenario 350 based upon the in-memory executable metadata and renders the instance of the calculation scenario 352 to MDAV infrastructure 302. The activation box 354 at the end of the horizontal arrow 352 represents the communication to determine and render a type of the compilation request. MDAV compiler infrastructure 302 deploys the instance of the calculation scenario (356) in an in-memory computing engine.

Figure 4:
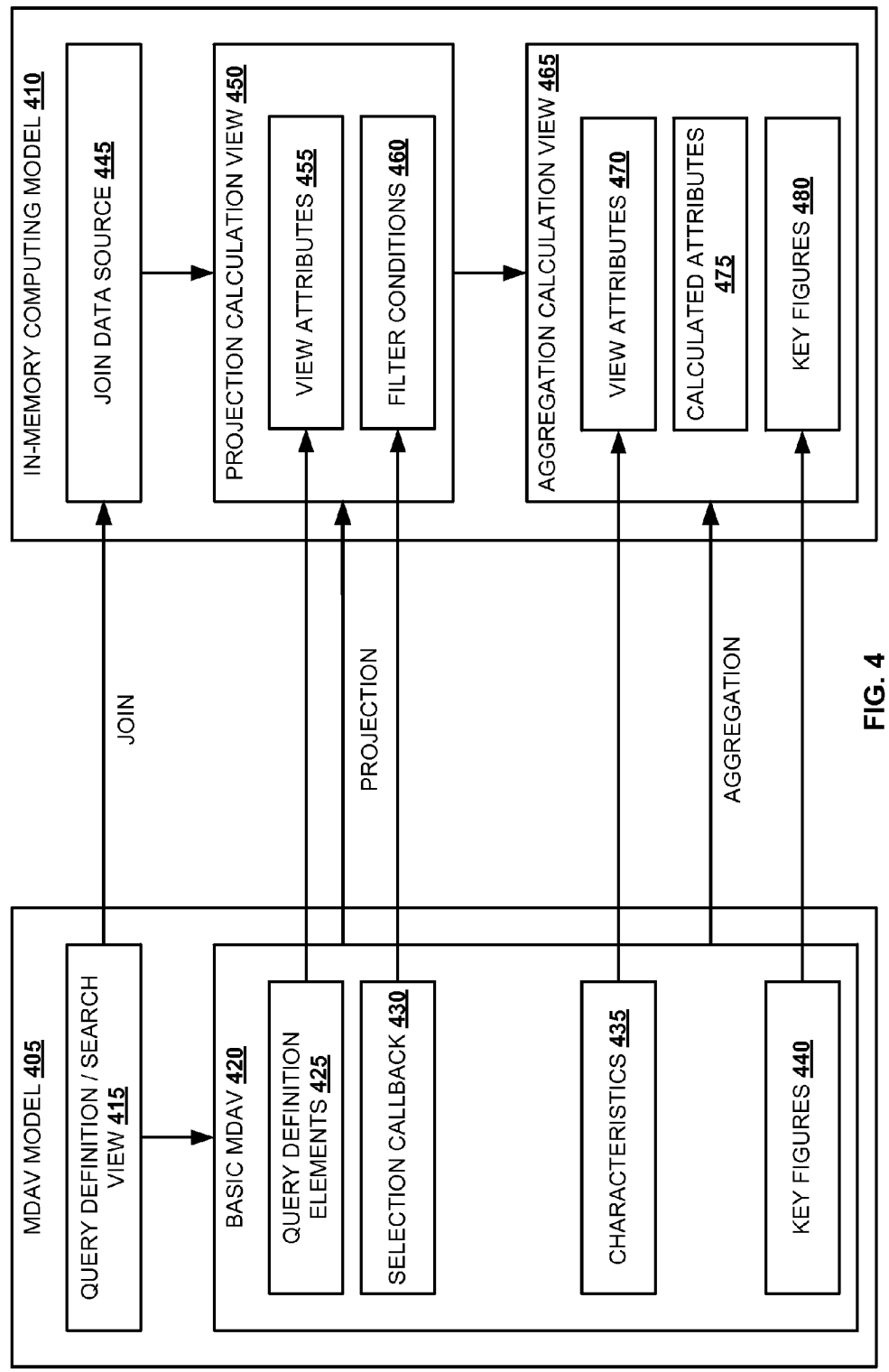
FIG. 4 is a block diagram illustrating a data flow to generate a calculation pattern, according to an embodiment.

FIG. 4 is a block diagram illustrating a data flow to generate a calculation pattern, according to an embodiment. In an embodiment, transforming the MDAV metadata includes mapping the MDAV metadata corresponding to the compilation request with calculation patterns associated with the in-memory computing engine. A calculation pattern describes a procedure to understand a relation between the MDAV metadata and the in-memory computing engine executable metadata, and execute the MDAV metadata in the in-memory computing engine. The calculation pattern outlines a step-by-step procedure for transforming the MDAV metadata into an in-memory computing engine executable metadata. The calculation pattern includes a set of artifacts of the in-memory computing engine executable metadata as a result of a transformation performed on the MDAV metadata.

FIG. 4 illustrates the data flow of the elements involved in generation of a calculation pattern. Block 405 represents an MDAV model, including contents of an MDAV metadata corresponding to the compilation request. Contents of an MDAV metadata include query definition 415, basic MDAV 420 including query definition elements 425, selection callbacks 430, characteristics 435 and key FIGS. 440. Query definition 415, also referred to as a search view, includes a representation of business objects included in the MDAV metadata, and a definition of one or more data sources that are involved in the transformation. Query definition 415 represents an input to the compiler infrastructure. A basic MDAV may include as an elementary MDAV representing a foundation to perform the analytical processing. Basic MDAV (for e.g. 420) is a view of query definition 415 associated with the MDAV metadata, which defines a view of MDAV metadata on several business objects. Selection callback 430 may be described as a code that allows a secondary layer to call a function from a primary layer in a computer program. Selection callbacks may represent transformation rules for the MDAV metadata, and are evaluated based upon attributes corresponding to the query definition in the MDAV metadata. Query definition elements 425 represent the contents of query definition 415. A key figure may include a measure and a characteristic may include a dimension. A dimension represents a group of one or more enumerable business objects like products, people, financial elements, and time. For example, a sales report may be viewed in dimensions of a product, a store, geography, a date, a quantity, revenue generated, and the like. A measure or a metric is a quantity as ascertained by comparison with a standard, usually denoted in some metric, for example, units sold and dollars. A measure, such as sales revenue, can be displayed for dimension customer, product and geography. For example, in a sales report, "quantity count" can be displayed for dimension "quantity". Other measures may include sum of sales revenue, count of a store, and the like. A measure may be a result of an aggregation of identical measures for a dimension. For instance, measure "revenue" may be displayed for dimension "year". Here, the measure describes an aggregation of all the revenues for all the years. A measure can also be displayed for each of the values or records within a dimension. A value or a record may be described as a quantity (for example, numeric quantity) that has been defined for a particular instance of the calculation scenario.

Block 410 represents an in-memory computing model, including corresponding attributes that are executable by the in-memory computing engine. Attributes include contents of the MDAV metadata that are transformed into in-memory computing engine executable metadata. Attributes may be classified into two groups: a first set of attributes that constitute a part of the application server data; and a second set of attributes that are associated with master data of an enterprise including a group of one or more application servers. The master data corresponds to the MDAV metadata associated with the enterprise. In-memory computing model 410 represents the elements that are generated in the process of generation of a calculation pattern executable by the in-memory computing engine, and includes: join data source 445, a projection calculation view 450 and an aggregation calculation view 465.

In join data source 445, query definition 415 associated with the MDAV metadata are transformed into data source artifacts executable by the in-memory computing engine. The data source artifacts include an index table that joins rows and/or columns of two or more tables, and facilitate in querying tables that are linked or joined. In an embodiment, the data source artifacts allow join queries to be resolved without accessing or joining the corresponding tables. For the transformation of the MDAV metadata, attributes and corresponding keys are defined in join data source 445. The data source artifacts are rendered as input to projection calculation view 450.

At projection calculation view 450, query definition elements 425 associated with MDAV metadata are extracted from basic MDAV 420 and transformed into view artifacts 455 executable by the in-memory computing engine. A temporal join may be generated at projection calculation view 450. A temporal join defines a time-dependent characteristic of the data source, for instance a posting date; and key or an interval of the time-dependent characteristic. The temporal join enhances the feature of join data source 445 with join-conditions based upon validity dates associated with the query definition elements 425. Thus, a time dimension may be evaluated along with the query definition elements 425. Selection callbacks 430 associated with the MDAV metadata are transformed into filter condition artifacts 460 executable by the in-memory computing engine. A filter condition artifact (for e.g. 460) facilitates in filtering one or more sections (for e.g. fields of a table) of the query definition that are not necessary for generating the calculation pattern. Based upon view artifacts 455 and filter conditions 460, projection calculation view artifacts are generated that is executable by the in-memory computing engine. The projection calculation view artifacts are rendered as input to aggregation calculation view 465.

At aggregation calculation view 465, the projection calculation view artifacts including view attributes 470, calculated attributes 475 (for e.g. filter conditions, temporal joins, time dimension, and the like), and characteristics 435 and key FIGS. 440 from basic MDAV 420 are classified as primary artifacts and secondary artifacts. The classification as primary and secondary artifacts may be based upon a configuration of the system. Based upon the classification, an aggregation rule is applied to the primary artifacts to perform aggregation of all the elements generated during the process of transformation of the MDAV metadata into in-memory computing engine executable metadata. An aggregation calculation view artifact is generated as a result of the aggregation, which represents the calculation pattern. The calculation pattern is thus generated by transforming the MDAV metadata into an in-memory computing engine executable metadata.

In an embodiment, generating the projection calculation view artifact includes generating a temporal join projection calculation view by transforming a temporal join filter condition subsequent to transforming the selection callbacks. A temporal join view may combine of one or more records from two or more tables in a database, with one or more time based characteristics. A temporal join is transformed after the selection callbacks to minimize the data it operates upon. In another embodiment, generating the projection calculation view artifact includes generating a union aggregation calculation view artifact executable by the in-memory computing engine, by mapping one or more field names associated with the query definition to one or more field names associated with a union multidimensional analytical metadata. A union view may combine records from a table in a database, including combining an actual data with a planned data in a table, for comparison. In another embodiment, generating the projection calculation view artifact includes generating a join aggregation calculation view artifact executable by the in-memory computing engine by joining two or more data sources artifacts executable by the in-memory computing engine. A join view combines two sets of data into a single set. In yet another embodiment, generating the projection calculation view artifact includes generating a navigational aggregation calculation view artifact executable by the in-memory computing engine by mapping one or more navigational attributes associated with the multidimensional analytical metadata to a join calculation view master data. The navigational aggregation calculation view artifact may be generated to include flexibility while generating a calculation pattern involving reports including MDAV metadata.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
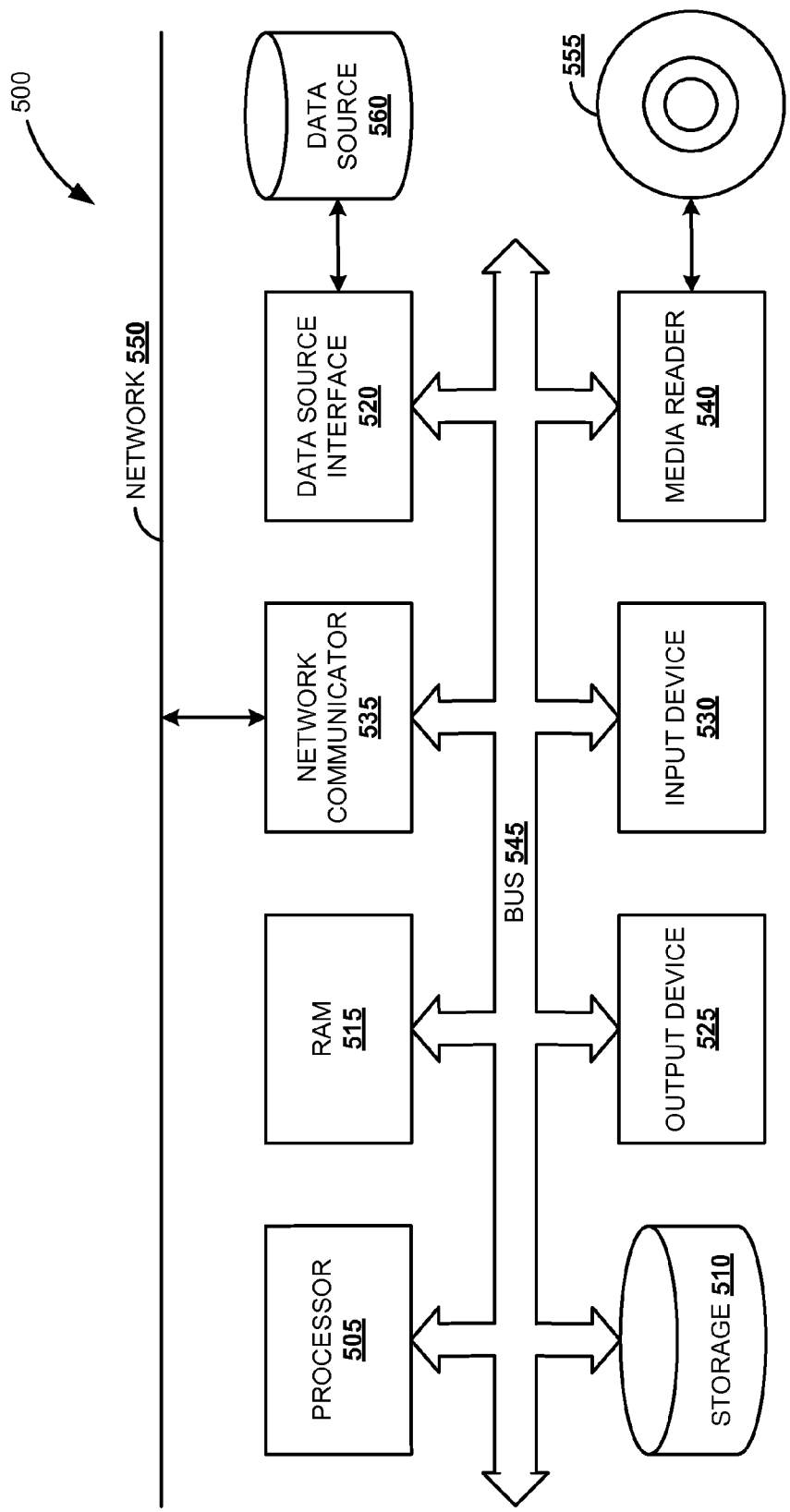
FIG. 5 is a block diagram illustrating a system, according to an embodiment.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, continuation servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to generate a compiler infrastructure, comprising:
   in response to receiving a compilation request including a request to generate an instance of a calculation scenario, determining a type of the compilation request to identify an associated transformation;
   interpreting metadata associated with the compilation request to query a database associated with an application server and retrieve multidimensional analytical metadata corresponding to the compilation request;
   based upon a transformation rule associated with the type of compilation request, a processor of the computer—
      preparing the multidimensional analytical metadata for transformation,
      processing the transformation rules along with the multidimensional analytical metadata, and
      transforming the multidimensional analytical metadata into an in-memory computing engine executable metadata, to generate the instance of a calculation scenario; and
   generating the compiler infrastructure by deploying the instance of the calculation scenario in the in-memory computing engine.

2. The computer implemented method of claim 1, wherein the compiler infrastructure is configured to transform the multidimensional analytical metadata associated with the application server into a comprehensive metadata that is executable in the in-memory computing engine.

3. The computer implemented method of claim 1, wherein the compiler infrastructure is configured to:
   cross-compile the multidimensional analytical metadata associated with one or more application server, and
   convert the cross-compiled multidimensional analytical metadata into the instance of the calculation scenario that is executable in the in-memory computing engine.

4. The computer implemented method of claim 1 further comprising: generating an analytical in-memory model to execute the multidimensional analytical metadata in one or more databases associated with corresponding one or more application servers by:
   loading the multidimensional analytical metadata in the databases associated with the corresponding application servers;
   based upon one or more associated parameters and one or more associated semantics of the application servers, performing a cross-database transformation of the loaded multidimensional analytical metadata to metadata executable by the in-memory model; and
   deploying the transformed metadata into an in-memory computing engine associated with the in-memory model.

5. The computer implemented method of claim 4, wherein generating the analytical in-memory model comprises:
   an analytical engine to render multidimensional analytical metadata associated with the application server for compiling;
   a data provider associated with the analytical engine to read the multidimensional analytical metadata associated with the application server and to initiate a runtime metadata and a runtime analyzer for compiling;
   the runtime analyzer to instruct a compiler to retrieve the instance of the calculation scenario; and
   the compiler to receive the compilation request and generate the compiler infrastructure, wherein the compiler infrastructure is associated with the instance of the calculation scenario.

6. The computer implemented method of claim 1, wherein retrieving the multidimensional analytical metadata comprise multidimensional attributes including:

retrieving a first set of attributes that are associated with the corresponding application server; and retrieving a second set of attributes that are associated with master data of an enterprise, wherein the enterprise includes one or more application servers, and wherein the master data corresponds to multidimensional analytical metadata associated with the enterprise.

7. The computer implemented method of claim 1, wherein generating the instance of a calculation scenario further comprises:

generating a first part of the calculation scenario generated based upon the first set of attributes; and generating a second part of the calculation scenario generated based upon an aggregation of the second set of attributes and the master data of the enterprise.

8. The computer implemented method of claim 1, wherein retrieving the multidimensional analytical metadata includes retrieving one or more contents of the multidimensional analytical metadata comprising:

retrieving a query definition and retrieving one or more basic multidimensional analytical views including one or more query definition elements, one or more selection callbacks, one or more characteristics and one or more key figures associated with the basic multidimensional analytical views, wherein the contents of the multidimensional analytical metadata are transformed into one or more artifacts of the in-memory computing engine executable metadata by the compiler infrastructure.

9. The computer implemented method of claim 1, wherein transforming the multidimensional analytical metadata comprises: mapping the multidimensional analytical metadata corresponding to the compilation request with one or more calculation patterns associated with the in-memory computing engine.

10. The computer implemented method of claim 9, wherein generating the instance of the calculation scenario comprises generating the calculation pattern by:

transforming the query definitions associated with the multidimensional analytical metadata into one or more data source artifacts executable by the in-memory computing engine, by defining one or more attributes to execute the transformation;

generating a projection calculation view artifact executable by the in-memory computing engine, by transforming the query definition elements associated with the multidimensional analytical metadata into one or more view artifacts executable by the in-memory computing engine and transforming the selection callbacks associated with the multidimensional analytical metadata into one or more filter condition artifacts executable by the in-memory computing engine; and generating an aggregation calculation view artifact executable by the in-memory computing engine by determining primary artifacts and secondary artifacts from the data source artifacts, view artifacts, and filter condition artifacts, applying an aggregation rule to the primary artifacts and mapping one or more field names associated with the query definition to one or more field names associated with the multidimensional analytical metadata.

11. The computer implemented method of claim 10, wherein generating a projection calculation view artifact further comprises: generating a temporal join projection calculation view by transforming the temporal join filter condition subsequent to transforming the selection callbacks.

12. The computer implemented method of claim 10 further comprising:

generating a union aggregation calculation view artifact executable by the in-memory computing engine by mapping one or more field names corresponding to the query definition with one or more field names associated with a union multidimensional analytical metadata.

13. The computer implemented method of claim 10 further comprising: generating a join aggregation calculation view artifact executable by the in-memory computing engine by joining two or more data sources artifacts executable by the in-memory computing engine.

14. The computer implemented method of claim 10 further comprising:

generating a navigational aggregation calculation view artifact executable by the in-memory computing engine by mapping one or more navigational corresponding to the multidimensional analytical metadata with a join calculation view master data.

15. The computer implemented method of claim 10 further comprising: a computer generated user interface to send the compilation request to a compiler associated with the compiler infrastructure.

16. An article of manufacture including a non-transitory computer readable storage medium to tangibly store instructions, which when executed by a computer, cause the computer to:

in response to receiving a compilation request including a request to generate an instance of a calculation scenario, determine a type of the compilation request to identify an associated transformation;

interpret metadata associated with the compilation request to query a database associated with an application server and retrieve multidimensional analytical metadata corresponding to the compilation request;

based upon a transformation rule associated with the type of compilation request, preparing the multidimensional analytical metadata for transformation, processing the transformation rules along with the multidimensional analytical metadata, and transform the multidimensional analytical metadata into an in-memory computing engine executable metadata, to generate the instance of a calculation scenario; and generate the compiler infrastructure by deploying the instance of the calculation scenario in the in-memory computing engine.

17. The article of manufacture of claim 16 further cause the computer to:

transform one or more query definitions associated with the multidimensional analytical metadata into one or more data source artifacts executable by the in-memory computing engine;

transform one or more query definition elements associated with the multidimensional analytical metadata into one or more view artifacts executable by the in-memory computing engine;

transform one or more selection callbacks associated with the multidimensional analytical metadata into one or more filter condition artifacts executable by the in-memory computing engine;

generate a projection calculation view artifact executable by the in-memory computing engine based upon the view artifacts and the filter condition artifacts; and generate an aggregation calculation view artifact executable by the in-memory computing engine by determining primary artifacts and secondary artifacts from the data source artifacts, view artifacts, and filter condition artifacts, applying an aggregation rule to the primary artifacts and mapping one or more field names associated with the query definition to one or more field names associated with the multidimensional analytical metadata.

18. A computing system to generate a compiler infrastructure, comprising:
   a processor to read and execute instructions stored in one or more memory elements; and
   the one or more memory elements storing instructions related to :
      the processor to determine a type of a compilation request in response to receiving a compilation request including a request to generate an instance of a calculation scenario, and to identify an associated transformation based upon the type, and to query a database associated with an application server and retrieve multidimensional analytical metadata corresponding to the compilation request;
      a multidimensional analytical compiler to
         identify a transformation rule associated with the type of the compilation request,
         prepare the multidimensional analytical metadata for transformation,
         process the transformation rules along with the multidimensional analytical metadata, and
         transform the multidimensional analytical metadata into an in-memory computing engine executable metadata;
      the in-memory computing engine to generate the instance of a calculation scenario based upon the transformed in-memory computing engine executable metadata and to generate the compiler infrastructure by deploying the instance of the calculation scenario.

19. The computing system of claim 18, wherein the compiler infrastructure further comprises:
   a transformation module to transform one or more contents of the multidimensional analytical metadata into one or more artifacts executable by the in-memory computing engine; and
   a pattern generator to generate a calculation pattern by mapping the multidimensional analytical metadata with metadata executable by the in-memory computing engine.

* * * * *